April 20, 1943.   O. HANSEN   2,316,861
EGG BEATER
Filed Nov. 15, 1941    2 Sheets-Sheet 1
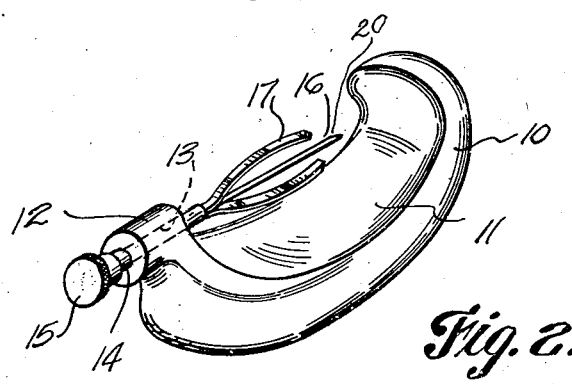
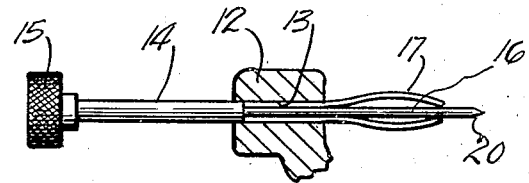
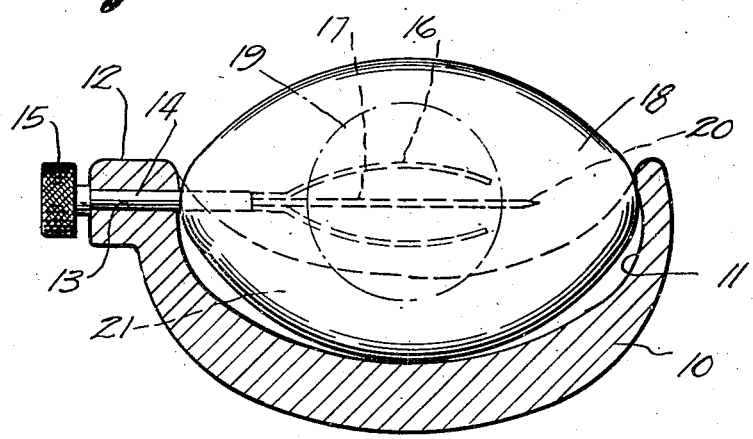
Fig. 9.
INVENTOR.
OLIVER HANSEN.
BY Louis Chayka ATTY.

April 20, 1943.  O. HANSEN  2,316,861
EGG BEATER
Filed Nov. 15, 1941  2 Sheets-Sheet 2
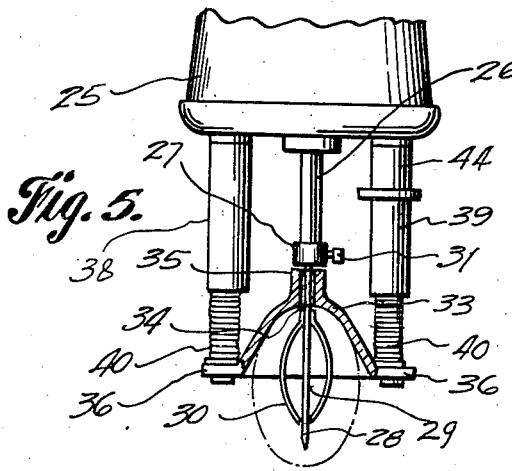
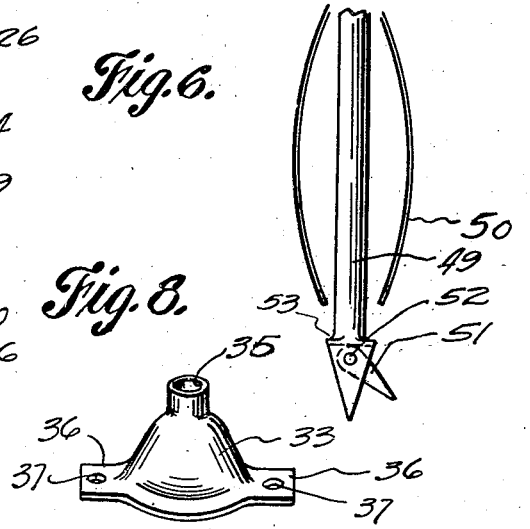
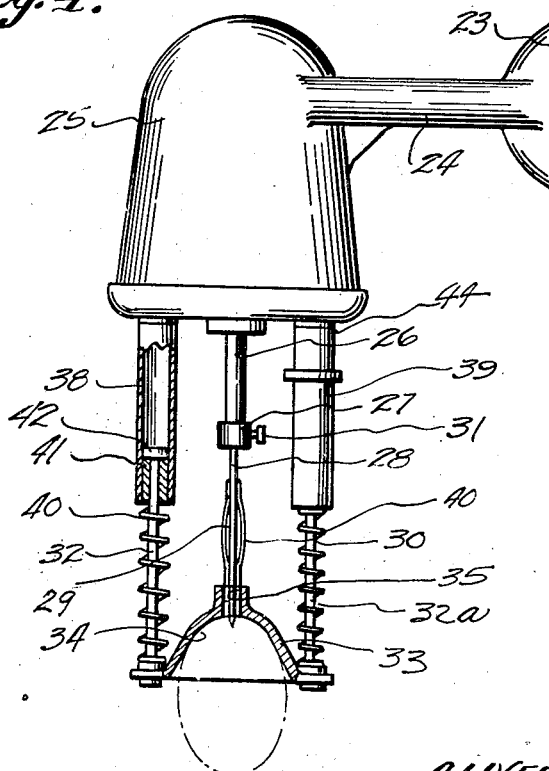
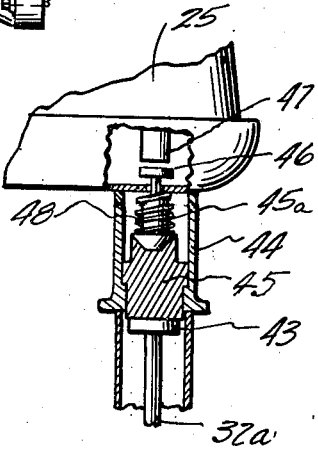
INVENTOR.
OLIVER HANSEN.
BY Louis Chayka
ATTY.

Patented Apr. 20, 1943

2,316,861

UNITED STATES PATENT OFFICE 2,316,861

EGG BEATER

Oliver Hansen, Detroit, Mich.

Application November 15, 1941, Serial No. 419,229

2 Claims. (Cl. 259—110)

The purpose of my invention is to provide a simple and effective device for scrambling eggs without the need of any cups or containers, as the scrambling is effected within the shell of the egg itself. This feature eliminates the need of washing of containers which otherwise would have to be used for the purpose. My additional purpose is to provide a device which is inexpensive, simple in design and easy to make.

As will be seen from the description which follows, the scrambling of an egg with the aid of my invention becomes a simple matter which can be effected promptly and easily. Because of this, the invention will be found very useful at home, particularly where only light housekeeping is contemplated, and it will be particularly desirable for use in restaurants, public bars, clubs, and other establishments.

I shall now describe my invention with respect to the accompanying drawings, in which:

Fig. 1 is a perspective view of a simple variety of my device.

Fig. 2 is a fragmentary side view of the device shown in Fig. 1, showing the location of a member thereof.

Fig. 3 is a longitudinal sectional view of the device shown in Fig. 1.

Fig. 4 is a side elevation, partly in section, of another form of my device provided with an electric motor for effective operation.

Fig. 5 is a side elevation, partly in section, of a part of the device shown in Fig. 5 in its operative position.

Fig. 6 is a fragmentary side elevation of a modified agitator which may be used in my device.

Fig. 7 is a sectional view of an electric switch forming a part of my device shown in Figs. 4 and 5.

Fig. 8 is a perspective view of a cup forming a part of my device shown in Figs. 4 and 5.

Fig. 9 is a perspective view of another modified agitator which may be used in my device.

Similar numerals refer to similar parts throughout the several views.

In its simplest form the device of my invention comprises a cradle 10, which may be made of rubber or plastic or some other suitable substance, said cradle comprising a concave bowl 11 and a cylindrical buss 12 located at one end of the cradle and provided with a central passage 13. Slideably disposed within said passage and projecting into the bowl is an agitator or scrambler comprising a shank 14 provided with a knob 15. At the opposite end said shank 14 extends to form a blade 16 and supports two leaf-springs 17, made of thin flexible strips of metal. Normally said springs expand radially from blade 16. When, however, shank 14 is partly withdrawn outwardly by means of knob 15, said springs entering passage 13 are compressed against the surface of said blade 16. How springs are compressed while the shank is being withdrawn is shown in Fig. 2.

The operation of the device is as follows: When shank 14 is withdrawn, as above stated, an egg to be scrambled is placed within bowl 11, as shown in Fig. 3, whereupon the cradle is held firmly in hand and shank 14 is pushed inwardly by means of knob 15 towards the middle of bowl 11. This causes the pointed end 20 of blade 16 to break the shell of egg 18 at the point of contact with said shell. Blade 16 and springs 17 enter the interior of said egg, as shown in Fig. 3, where the springs, unconfined by the wall of passage 13, curve away from blade 16. The entry of said blade into the interior of the egg serves to break the filmy envelope of yoke 19 within said egg. Both the yolk and the white 21 of said egg may now be thoroughly mixed or scrambled either by a rotary motion of the agitator within the egg, that is, the blade and the springs, or by grasping the egg within the cradle and shanking the egg so that its contents are thrown against the blade and the springs. As a result of the shaking, both the yolk and the white are thoroughly mixed. All that is necessary thereafter is to withdraw the egg from the cradle, to break it open, whereupon it is ready to be used for whatever culinary purpose it may serve.

The above description pertains to a purely manual operation of my device. An improvement of said device, including a motor-driven agitator, is shown in Fig. 4. In this case, the scrambling agitator is operated by means of a motor 25 affixed by means of a cross-arm 24 to a bracket 22. Numeral 23 indicates bolts or screws by means of which the bracket 22 may be affixed to some stationary object like a wall or a cabinet. The shaft 26 of motor 25 projects downwardly and terminates in a socket 27. The socket is adapted to receive a scrambling implement, which consists of a shank 28 extending into a blade 29 and supporting flexible leaf-springs 30. Screw 31 serves to secure said blade within socket 27.

Suspended from the lower part of the housing of motor 25 by means of rods 32 and 32a, is an inverted cup 33 which, in a perspective view is more accurately shown in Fig. 8. A centrally located aperture 34 within the dome of the cup permits free rotation therein of blade 29. Surrounding said aperture and rising immediately above it, is a collar 35, the purpose of which is the same as that of passage 13 in Fig. 1, namely, to depress the leaf-springs when same are in inoperative position. This feature will be described below in connection with the operation of the device herein discussed.

Rods 32 and 32a which support cup 33, are secured thereto by means of holes 37 in ears 36, projecting radially from the lower rim of cup 33. Said rods are disposed within sleeves 38 and 39 respectively, in a telescopic relation thereto. Numeral 40 indicates coiled springs surrounding said rods and disposed between ears 36 and the lower ends of sleeves 38 and 39 respectively. Numeral 41 indicates hollow plugs at the lower end of sleeves 38 and 39. The plugs serve as bearings for the sliding rods 32 and 32a. At the upper end the rod in sleeve 38 is provided with a flange 42, to prevent said rod from sliding down out of said sleeve. A flange 43 on rod 32a is intended to serve a similar purpose. A switch to close the electric circuit which supplies motor 25 with motive energy, is located within a cylindrical housing 44 above sleeve 39. The details of said switch are shown in Fig. 7.

As will be seen, the switch is actuated by means of rod 32a. When the rod is pushed up, it bears against a sliding block 45, supporting a column 45a, terminating in a contact point 46 and held apart from another contact point 47 by means of a coiled spring 48. Obviously the construction of the switch is not a part of the invention and any other switch may be used just as well.

The device operates as follows: An egg is taken firmly in hand and one end of it is inserted into the hollow of cup 33, as shown in Fig. 4. As the point of the blade protrudes through aperture 34 into the interior of the cup, the shell of the egg will be broken at the contact point and the end of the blade will enter the interior of the egg. Thereupon, the egg is pushed upwardly, bearing against the cup and against the tension of coiled springs 40, to a position shown in Fig. 5. This will allow leaf-springs 30 to enter the egg and to expand, as shown in said Fig. 5. Simultaneously, rod 32a will serve to close the electric circuit by means of the switch described above, whereupon motor 25 will set the blade and the leaf-springs into a rapid rotary motion within the interior of the egg. Because of the small contents of the egg and the rapid motion of the blade and the leaf-springs, the scrambling is effected almost immediately. When the egg is withdrawn downwardly, cup 33 actuated by springs 40 reverts to its original position shown in Fig. 4, the switch is open again, the circuit is broken and the motor is brought to a stop.

Fig. 6 shows a variety of a blade which may be used for scrambling purposes in my device. In this case the blade 49 is not only provided with leaf-springs 50 as in Figs. 4 and 5, but is also equipped with a movable member 51, pivoted by means of a pin 52 to the end of said blade 49. When the blade is inserted into the interior of the egg and made to rotate therein, said member 51 is thrown outwardly by centrifugal force, as shown in dotted lines, and aids in mixing the contents of the egg.

It will be observed that the diameter of the end of blade 49 is larger than that of the rest of its body, which results in the formation of shoulders 53. The free ends of leaf-springs 50, when said springs are compressed, abut said shoulders and in this manner, protected by said shoulders, are enabled to enter smoothly the interior of the egg which is to be scrambled.

Another modified agitator is shown in Fig. 9. In this case the point 56 of the blade 54 is provided with shoulders 55, but said point is immovable. 57 indicates leaf-springs. 58 indicates the shank of the agitator.

It will be understood that certain changes may be introduced in my devices as I have described them without departing from the principle of my invention. What I, therefore, wish to claim is as follows:

1. An elongated pointed blade, radially expansible resilient members affixed thereto and extending in the direction of the shaft to a point adjacent the tip thereof, a centrally perforated inverted cup slidably seated on said blade, a collar on the top of said cup encircling the blade and adapted to compress the resilient members flat against the body of the blade, rod means suspending said cup, coil springs on said rod means urging the cup and the collar towards the tip of the blade, said resilient members being adapted to expand radially when the collar is moved away from the tip of the blade against the tension of the coil springs, and motor means to impart a rotary motion to the blade and the resilient members affixed thereto.

2. An inverted cup provided with a centrally located aperture in its bottom, an elongated blade within said aperture, radially expansible resilient members affixed to the blade, a collar on said cup encircling the blade and the resilient members, rod means to support said cup, coil springs on said rods urging the cup with the collar downwardly towards the tip of the blade, to compress the radially expansible members flat against the body of the blade, said members being adapted to expand when the collar is moved away from the tip of the shaft, an electric switch actuated by one of the rods when the cup is moved away from the tip of the blade, and motor means to impart a rotary motion to said blade.

OLIVER HANSEN.